3,138,616
SYNTHESIS OF ACETALS OF CYANO-
ACETALDEHYDE
Frank Scotti, Stamford, Conn., and Everett Joseph
Frazza, Yorktown Heights, N.Y., assignors to American Cyanamid Company, New York, N.Y., a corporation of Maine
No Drawing. Filed Nov. 29, 1960, Ser. No. 72,294
7 Claims. (Cl. 260—340.9)

This invention relates to a method for preparing acetals of β-cyanoacetaldehyde. More particularly, it relates to a method for preparing acetals of β-cyanoacetaldehyde in good yields from readily available starting materials.

The acetals of β-cyanoacetaldehyde with which the present invention is concerned may be represented by the formula (I) 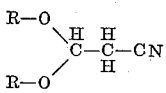

in which R is selected from the group consisting of saturated aliphatic and cycloaliphatic radicals, R in said Formula I being the residue of a monohydric alcohol.

Acetals of β-cyanoacetaldehyde with which the present invention is also concerned may be represented by the formula (II) 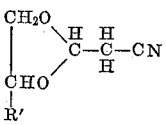

in which R' is selected from the group consisting of

—H, —CH₂OH, 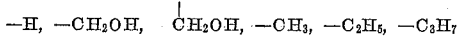

and the like. As to this class of acetals, which may also be called 1,3-dioxolane-2-acetonitriles, it will be noted from an inspection of said Formula II that the alkylene grouping when taken together with R' constitutes the residue of a polyhydric, e.g. a dihydric, trihydric or tetrahydric alcohol.

The classic method for the preparation of acetals from aldehydes and alcohols under essentially anhydrous conditions in the presence of acidic catalysts is well known. This method, however, is not readily adaptable to the preparation of acetals containing a nitrile group in the molecule since nitriles also react with alcohols to form imino ethers. In view of the inapplicability of the classic method for the preparation of acetals containing a nitrile group in the molecule, several other tedious procedures for their preparation have been employed. Even these methods have not met with a marked degree of success because of their inherent disadvantages. For example, the preparation of acetals of cyanopropionaldehyde from acrylonitrile, carbon monoxide, hydrogen and alcohols is unattractive because of the high temperatures, pressures and catalysts which are required.

In the preparation of acetals of β-cyanoacetaldehyde numerous difficulties are also experienced. Uhle and Jacobs in the Journal of Organic Chemistry, 10, 81 (1945) reported that only a 14% yield of the diethyl acetal of cyanoacetaldehyde was obtained from the bromoacetal and that the product required long and careful fractionation for purification.

McElvain and Clarke's procedure, reported in the Journal of the American Chemical Society, 69, 2657 (1947), constituted an improvement over the method of Uhle and Jacobs by employing a different but circuitous route. Their procedure comprised dehydrating β,β-diethoxypropionamide which was derived from the acetal ester which in turn was produced from sodium enolate. The principal disadvantage of such multistep procedure is that the yields are low.

It is an object of this invention to prepare acetals of β-cyanoacetaldehyde in good yields from readily available starting materials.

It is a further object of the present invention to prepare acetals of β-cyanoacetaldehyde without encountering numerous disadvantages of prior art methods which are difficult, time consuming and unattractive from a commercial viewpoint.

Unexpectedly, it has now been discovered that the disadvantages of the prior art methods are readily overcome by our novel method for the preparation of acetals of β-cyanoacetaldehyde. The present process involves reacting β-chloroacrylonitrile with an alcohol in the presence of an amount of base at least equal to 0.1 molecular excess of the amount of β-chloroacrylonitrile employed in an inert reaction medium. Illustratively, the reaction is believed to proceed in the following manner in which methanol is employed as the alcohol and dimethylacetal of β-cyanoacetaldehyde is obtained:

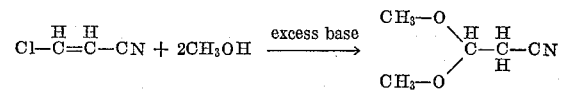

On completion of the reaction which is usually conducted at a temperature between about 0° and about 50° C. and at atmospheric pressure, the metal halide precipitate formed from the cation of the base employed and the chloride ion is separated by conventional means and the acetal of β-cyanoacetaldehyde is recovered in good yield from the residual liquor as by distillation, crystallization or other conventional methods of recovery.

Illustrative of the alcohols which may be employed according to the process of the present invention, there may be mentioned saturated aliphatic alcohols having straight or branched chains and having one, two or more hydroxy groupings present thereon such as methyl, ethyl, propyl, isopropyl, butyl, isobutyl, amyl, hexyl, octyl, dodecyl, octadecyl alcohol, ethylene glycol, propylene glycol, butylene glycol, glycerol and the like and saturated cycloaliphatic alcohols having 5 and 6 membered rings such as cyclopentanol, cyclohexanol and the like.

When a monohydric saturated aliphatic alcohol is employed as a reactant in the process of the present invention it will be noted that as to relative amounts of the reactants about two moles of such alcohol is required for about each mole of β-chloroacrylonitrile. However, when a polyhydric, e.g. a dihydric, trihydric or tetrahydric, saturated aliphatic alcohol is used to prepare an acetal having an alkylene grouping forming a portion of an oxygen containing ring structure then as to the relative amounts of the reactants only about one mole of such alcohol is necessary for about each mol of β-chloroacrylonitrile. Preferably, the amount of alcohol, whether monohydric or polyhydric, is present in excess of the amount stoichiometrically required.

It is essential that the amount of base which is employed in the process be at least 0.1 molecular excess of the amount of β-chloroacrylonitrile employed. While the alkali or alkaline earth metal hydroxides such as sodium hydroxide, potassium hydroxide, lithium hydroxide, magnesium hydroxide, calcium hydroxide, barium hydroxide and the like may be employed, it is generally preferred to employ the alkoxide salt of the alcohol which may be prepared in situ by adding an alkali metal, e.g. sodium, potassium, lithium, rubidium, and cesium, to the reaction mixture. When an alkali metal is added to the reaction mixture to form the alkoxide salt in situ heating is generally necessary. Alternatively, the alkoxide salt may be prepared in an inert solvent which may then be added to the reaction mixture.

As was stated hereinabove temperatures between about 0° and 50° C. are generally employed. Usually, temperatures between 0° and 30° C. are preferred because of the exothermic nature of the reaction. The upper limit of the temperature range is generally determined by the boiling point of the reaction medium which is employed in the process.

The particular reaction medium employed in the process of this invention is restricted only in that it be inert to the reactants and is preferably a solvent therefor. Any of the conventional materials including aromatic hydrocarbons such as toluene and its homologs and their halogenated derivatives; esters such as ethyl acetate; ethers such as dioxane; and alcohols such as those employed as reactant starting materials may all be used. Preferably, the reaction medium is the same alcohol as that employed as the reactant starting material.

The time for completing the reaction is of course dependent upon the rate of addition of the reactants, temperature, and the amount of excess base employed. Generally, reaction times of from about one to about four hours have been observed to give good results. No criticality is seen in the manner of the addition of the reactants. Thus β-chloroacrylonitrile may be added to the alcohol already present in the reaction vessel, or the two reactants may be admixed simultaneously, or the alcohol may be added to β-chloroacrylonitrile present therein. The latter practice is generally preferred.

The products prepared according to the process of this invention which range from low boiling liquids to moderately high melting solids or waxes are capable of reacting with cellulose under normal textile finishing conditions so as to confer upon the cellulosic material rot resistance and other desirable properties. Moreover, the acetals of β-cyanoacetaldehyde are also useful as intermediates in the preparation of pharmaceuticals.

An alternative method for the preparation of acetals of β-cyanoacetaldehyde employing the over-all inventive concept herein is that of reacting a preformed β-cyanovinyl ether which may be prepared according to the process disclosed and claimed in the copending application Serial No. 704,880, filed December 24, 1957 (in which one of the present co-inventors is also a co-inventor), now abandoned, with an additional mole of alcohol in the presence of an amount of base, e.g. an alkali or alkaline earth metal hydroxide or an alkoxide salt, which is sufficient to catalyze the reaction. The amount of base thus required will, of course, usually be less than that essential to be employed in the preparation of an acetal of β-cyanoacetaldehyde directly from β-chloroacrylonitrile and an alcohol inasmuch as the necessity for furnishing an amount of base sufficient both to eliminate the chlorine atom from β-chloroacrylonitrile thereby forming a metal chloride and also to catalyze the addition of alcohol is avoided. Contrasted with the amount of base (at least 0.1 molecular excess or 1.1 moles) necessarily used when reacting β-chloroacrylonitrile with an alcohol, the amount of base thus required when reacting a preformed β-cyanovinyl ether with an alcohol is a catalytic amount. An amount of base, i.e. an alkali or alkaline earth metal hydroxide or alkoxide salt, equal to about 0.1 mole based upon the amount of β-cyanovinyl ether reactant has been employed with good success but slightly greater amounts may also be used. Reaction conditions including temperatures and times required are generally the same as those employed in the process of this invention when an acetal of β-cyanoacetaldehyde is prepared directly from β-chloroacrylonitrile and alcohol.

In order to illustrate the novel features of the present invention, but not to limit it, the following examples are given.

EXAMPLE 1

*Diethylacetal of β-Cyanoacetaldehyde*

A solution of 17.4 grams of sodium ethoxide in 150 ml. of ethanol is added to a stirred solution of 21.9 grams of β-chloroacrylonitrile in 150 ml. of ethanol. The addition is completed in 45 minutes and the reaction mixture is stirred at 30° C. for an additional four hours whereupon the mixture is neutralized with glacial acetic acid to a phenolphthalein end point. The precipitated sodium chloride is removed by filtration and evaporation of the ethanol followed by distillation of the residual liquid yielding 28 grams of diethylacetal of β-cyanoacetaldehyde, B.P. 57° C./1 mm., $n_D^{25}$ 1.4142.

EXAMPLE 2

*Dimethylacetal of β-Cyanoacetaldehyde*

The procedure of Example 1 is repeated in all essential respects except that 87.5 grams (1 mole) of β-chloroacrylonitrile, 23 grams (1.1 mole) of sodium metal and 400 ml. of methanol as reactant and solvent are employed.

Yield 55.9%; B.P. 94–98° C./25 mm. $n_D^{36}$ 1.4105.

*Analysis.*—Calculated for $C_5H_9NO_2$: C, 52.17; H, 7.82; N, 12.17. Found: C, 52.43; H, 7.86; N, 12.28.

EXAMPLE 3

*Dicyclohexyl Acetal of β-Cyanoacetaldehyde*

A solution of 14.6 grams (.12 mole) of sodium cyclohexylate in 150 ml. of cyclohexanol is added over a period of forty-five minutes to a stirred solution of 8.7 grams (0.1 mole) of β-chloroacrylonitrile in 150 ml. of cyclohexanol. The reaction mixture is stirred at 25° C. for an additional four hours whereupon the mixture is neutralized with glacial acetic acid to a phenolphthalein end point. The precipitated sodium chloride is removed by filtration and distillation of the residual liquid affords 80% yield of dicyclohexylacetal of β-cyanoacetaldehyde.

EXAMPLE 4

*1,3-Dioxolane-2-Acetonitrile*

Metallic sodium (2.5 grams) is cautiously added to 12 grams of ethylene glycol. To this solution is added with stirring a solution comprising 8.75 grams of β-chloroacrylonitrile and 12 grams of ethylene glycol. The addition is completed in 30 minutes and the mixture is stirred for an additional hour at 20° C. whereupon the precipitated sodium chloride was removed by filtration. The excess ethylene glycol was removed by distillation and 85% yield of the 1,3-dioxolane-2-acetonitrile is isolated.

EXAMPLE 5

*Dimethylacetal of β-Cyanoacetaldehyde*

To 200 ml. of anhydrous methanol 0.3 gram of metallic sodium is added cautiously. To the resulting alkoxide solution 83 grams of β-methoxyacrylonitrile is added with stirring. On completion of the addition, the mixture is stirred for an additional hour at 20° C. The methanol solvent is removed and distillation yields 80% of dimethyl acetal of β-cyanoacetaldehyde; B.P. 94–98° C./25 mm. $n_D^{36}$ 1.4105.

We claim:

1. A process for the preparation of an acetal of β-cyanoacetaldehyde of the formula:

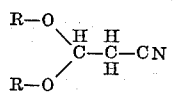

wherein R is selected from the group consisting of alkyl of 1 to 18 carbon atoms and cycloalkyl of 5 to 6 carbon atoms which comprises reacting about one mole of β-chloroacrylonitrile with about two moles of an alcohol of the formula ROH, wherein R is defined as above, in the presence of an amount of base equal to at least 0.1 molecular excess of the amount of said β-chloroacrylonitrile and recovering said acetal.

2. A process as in claim 1 in which the reaction is conducted at a temperature between about 0° and about 50° C.

3. A process as in claim 2 in which the reaction is conducted in an inert reaction medium.

4. A process for the preparation of an acetal of β-cyanoacetaldehyde of the formula:

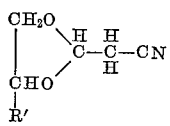

wherein R' is selected from the group consisting of

—H, —CH$_3$, —C$_2$H$_5$, —C$_3$H$_7$, —CH$_2$OH, and —CHOH
                                              |
                                              CH$_2$OH which comprises reacting about one mole of β-chloroacrylonitrile with about one mole of a polyhydric alcohol of the formula R'—CHOH—CH$_2$OH, wherein R' is defined as above, in the presence of an amount of base equal to at least 0.1 molecular excess of said β-chloroacrylonitrile and recovering said acetal.

5. A process as in claim 4 in which the reaction is conducted at a temperature between about 0° and about 50° C.

6. A process as in claim 5 in which the reaction is conducted in an inert reaction medium.

7. A process for the preparation of the diethylacetal of β-cyanoacetaldehyde which comprises reacting about one mole of β-chloroacrylonitrile with about two moles of ethyl alcohol in the presence of an amount of base equal to at least 0.1 molecular excess of the amount of said β-chloroacrylonitrile and recovering said acetal.

References Cited in the file of this patent

UNITED STATES PATENTS 2,844,593   Riener et al. _____ July 22, 1958

OTHER REFERENCES

Gundermann et al.: "Chem. Ber.," vol. 92, pages 108–7 (1959).